US009324045B2

(12) United States Patent
Weber

(10) Patent No.: US 9,324,045 B2
(45) Date of Patent: Apr. 26, 2016

(54) COMPUTER IMPLEMENTED METHOD, PROCESS MODELLING SYSTEM AND NON-TRANSITORY COMPUTER READABLE DATA CARRIER FOR TRANSFORMING A META-MODEL FROM A PROCESS MODEL

(71) Applicant: Siemens Aktiengesellschaft, Munich (DE)

(72) Inventor: Norbert Weber, Glonn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 764 days.

(21) Appl. No.: 13/646,059

(22) Filed: Oct. 5, 2012

(65) Prior Publication Data

US 2014/0100830 A1   Apr. 10, 2014

(51) Int. Cl.
*G06Q 10/06* (2012.01)
(52) U.S. Cl.
CPC ...................................... *G06Q 10/06* (2013.01)
(58) Field of Classification Search
CPC ........................................................ G06Q 10/06
USPC ................................................. 703/6; 717/104
See application file for complete search history.

(56) References Cited

U.S. PATENT DOCUMENTS

| 8,423,477 | B2* | 4/2013 | Das ............................ G06F 8/10 705/301 |
| 2007/0226023 | A1* | 9/2007 | Das et al. ............................ 705/7 |
| 2008/0163164 | A1* | 7/2008 | Chowdhary et al. ........... 717/106 |
| 2012/0159426 | A1* | 6/2012 | Seel ................................ 717/104 |

* cited by examiner

*Primary Examiner* — Eunhee Kim
(74) *Attorney, Agent, or Firm* — Slayden Grubert Beard PLLC

(57) ABSTRACT

A computer implemented method for instantiating a process in a process modelling system may include modelling the process as a process model, said process model comprising process objects and automatically transforming the process model into a meta model, said meta model comprising the process objects of the process model as definitions of process object types in said meta model. Further, a process modelling system and a non-transitory computer readable media containing a computer program for performing said method are provided.

20 Claims, 2 Drawing Sheets

COMPUTER IMPLEMENTED METHOD, PROCESS MODELLING SYSTEM AND NON-TRANSITORY COMPUTER READABLE DATA CARRIER FOR TRANSFORMING A META-MODEL FROM A PROCESS MODEL

TECHNICAL FIELD

This disclosure relates to a computer implemented method for instantiating a process in a process modelling system, a respective process modelling system and a respective non-transitory computer readable data carrier.

BACKGROUND

In modern electronic systems and businesses the evaluation and execution of predefined processes is an important task.

With increased complexity of systems, e.g. production systems, and e.g. product or software development systems, the complexity of processes executed by or in said systems becomes higher.

In order to allow better planning and tracking of processes process descriptions are used to model said processes.

Such process descriptions comprise the process objects which are necessary to complete a process. Such process objects could for example be artefacts and roles. In such process descriptions responsibilities of roles for certain artefacts could be defined.

Some Business process management Tools, BPM-Tools, allow instantiating processes from their description and track the completion of the single process steps. For some BPM-Tools in order to allow the BPM-Tools to track the process execution the description of a process needs to include milestones of the process, artefacts needed to complete a milestone and the roles that are responsible for a certain artefact. Other BPM-Tools may work on the basis of different process objects.

For example in a software project a Milestone could be a "concept approved", the artefacts could be a requirements document, a project plan and a program module. The roles could be "manager" and "developer". In such a case the manager could be responsible for the requirements document and the project plan and the developer could be responsible for the program module.

Common BPM-Tools only allow assigning the responsibility for an artefact to a certain role but not to instances of a role. Therefore, in the above example, if there were two different developers they could not be individually assigned to a program module. Only all developers could be assigned to all program modules.

Accordingly, there is a need for a more flexible and granularly controllable BPM-Tool.

SUMMARY

In one embodiment, a computer implemented method for instantiating a process in a process modelling system comprises: modelling the process as a process model, said process model comprising process objects; and automatically transforming the process model into a meta model, said meta model comprising the process objects of the process model as definitions of process object types in said meta model.

In a further embodiment, for every user which is involved in the process a definition of a process object type is automatically created in the meta model. In a further embodiment, the process model and/or the meta model are modelled using a model description language. In a further embodiment, the model description language is a XML-based model description language. In a further embodiment, transformation rules are defined for the step of automatically transforming. In a further embodiment, the transformation rules are defined using a transformation definition language. In a further embodiment, the transformation definition language is an XML-based transformation definition language. In a further embodiment, the method further comprises assigning the relation between least one definition of a process object type in the meta model and at least one other definition of a process object type in the meta model. In a further embodiment, the responsibilities are automatically assigned in the meta model based on the responsibilities of the process objects in the process model. In a further embodiment, the process model and the meta model refer to a production process and/or a development process and/or a business process.

In another embodiment, a process modelling system for modelling a process comprises: a modelling unit configured to model a process model of said process, said process model comprising process objects; and a transformation unit configured to automatically transform the process model into a meta model, said meta model comprising the process objects of the process model as definitions of process object types in said meta model.

In a further embodiment, the transformation unit is configured to automatically create in the meta model an instance of a definition of a process object type for every user which is involved in the process. In a further embodiment, the modelling unit and/or the transformation unit are configured to model the process model and/or the meta model modelled using a model description language. In a further embodiment, the model description language is a XML-based model description language. In a further embodiment, the transformation unit is configured to use transformation rules for automatically transforming the process model into a meta model. In a further embodiment, the transformation rules are defined using a transformation definition language. In a further embodiment, the transformation definition language is an XML-based transformation definition language. In a further embodiment, the transformation unit is configured to automatically assign the relation between at least one definition of a process object type in the meta model and at least one other definition of a process object type in the meta model; and wherein the transformation unit is configured to automatically assign the relation in the meta model based on the responsibilities of the process objects in the process model. In a further embodiment, the process model and the meta model refer to a production process and/or a development process and/or a business process.

In another embodiment, a non-transitory computer readable data carrier comprises a computer program which comprises computer readable instructions which cause a computer to execute any of the methods disclosed above.

BRIEF DESCRIPTION OF THE DRAWINGS

Example embodiments will be explained in more detail below with reference to figures, in which.

DETAILED DESCRIPTION

Figure 1:
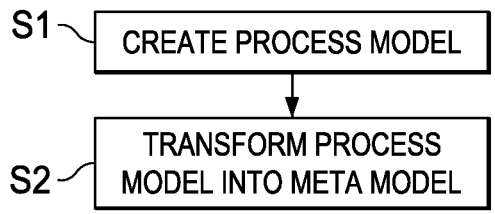
FIG. 1 shows a flow diagram of a method according to an example embodiment.

Various embodiments disclosed herein include:

A computer implemented method for instantiating a process in a process modelling system comprising the steps of modelling the process as a process model, said process model comprising process objects and automatically transforming the process model into a meta model, said meta model comprising the process objects of the process model as definitions of process object types in said meta model.

A process modelling system for modelling a process, comprising a modelling unit configured to model a process model of said process, said process model comprising process objects and a transformation unit for automatically transforming the process model into a meta model, said meta model comprising the process objects of the process model as definitions of process object types in said meta model.

A non-transitory computer readable data carrier comprising a computer program which comprises computer readable instructions which cause a computer to execute a method as described herein.

At least some of the disclosed embodiments are based on the conclusion that current process instantiation methods are very restricted when it comes to flexibly instantiating a process.

Therefore, such embodiments use this knowledge to provide a method that automatically generates an intermediate meta model—or just "meta model"—that defines all possible process object types and all possible interactions between said process object types.

The meta model can be seen as a set of rules, wherein the set of rules defines possible process object types. Furthermore for every process object type said set of rules also defines all possible interactions and links between the different process object types. For example the set rules in the meta model could define a process object type "concept approved", which would be a milestone, a process object type "concept draft" which would be an artefact, and a process object type "project manager", which would be a role. The set of rules then could define that an object instance of the type "project manager" could be responsible for an instance of a "concept draft" and the concept draft could be related to a project object instance of the milestone type "concept approved". Therefore, the meta model is similar to a XML schema for XML files.

Therefore some embodiments provide a method where a process model, which comprises process objects is automatically transformed into a meta model.

In the meta model a definition of a process object type is automatically created for every process object of the process model. Furthermore, the links or interactions of the process objects in the process model are automatically translated into rules of the meta model. Therefore, a meta model is created which defines all possible process object instances and all possible interactions between said process object instances. The automatically created meta model can then be used to instantiate the process.

Other embodiments provide a process modelling system which is configured to execute any of the methods disclosed herein and a non-transitory computer readable data carrier, which comprises a computer program comprising instructions to execute any of the methods disclosed herein.

In one embodiment for every user which is involved in the process a definition of a process object type is automatically created in the meta model. This allows further automation of the transformation process.

In a further embodiment the process model and/or the meta model are modelled using a model description language. By using description languages a human readable and easily editable document can be generated.

In a further embodiment the model description language is a XML-based model description language. XML is a standardised mark-up language and, therefore, is widely supported by a big number of tools which are available today.

In a further embodiment transformation rules are defined for the step of automatically transforming. If the step of transforming is based on certain transformation rules it is very easy to adapt the transformation to different use cases.

In a further embodiment the transformation rules are defined using a transformation definition language. By using definition languages a human readable and easily editable document can be generated.

In a further embodiment the transformation definition language is an XML-based transformation definition language. XML is a standardised mark-up language and, therefore, is widely supported by a big number of tools which are available today.

In a further embodiment the method comprises the further steps of assigning the relation between at least one definition of a process object type in the meta model and at least one other definition of a process object type in the meta model.

In a further embodiment the responsibilities are automatically assigned in the meta model based on the responsibilities of the process objects in the process model. This further automatizes the process of model transformation.

In a further embodiment the process model and the meta model refer to a production process and/or a development process and/or a business process. This allows adapting the disclosed embodiments to different use cases and different fields.

FIG. 1 shows a flow diagram of a method according to an example embodiment.

Accordingly, in a first step S1 the process 2 is modelled as a process model 4, said process model 4 comprising at least one process object 5. Furthermore, in a second step S2 the process model 4 is automatically transformed into a meta model 8, said meta model 8 comprising the process objects 5 of the process model 4 as definitions of process object types 6 in said meta model 8.

In another embodiment for every user which is involved in the process 2 a definition of a process object type 6 is automatically created in the meta model 8.

In another embodiment the process model 4 and/or the meta model 8 are modelled using a model description language. The model description language can be any language which is fit to describe a process model. The model description language can especially be a XML-based model description language or an UML-based model description language.

In another embodiment transformation rules 9 are defined for the step of automatically transforming. This transformation rules for example define how to transform the process objects 5 into definitions of process object types 6. For example a rule could define that for every process object 5 of type "project manager" a definition of a process object type 6 is defined in the meta model 8. Furthermore the rule could define that the names of the automatically created definitions of process object types 6 are based, in each case, on the name of the corresponding process object 5 plus a prepending or trailing string, e.g. "def_" or "_def".

In another embodiment the transformation rules 9 are defined using a transformation definition language. The transformation definition language can be any language which is fit to define transformation rules 9. The transformation definition language can especially be a XML-based transformation definition language or an UML-based transformation definition language.

In another embodiment the further step of assigning the relation between at least one definition of a process object type 6 in the meta model 8 and at least one other definition of a process object type 6 in the meta model 8 is automatically performed.

In another embodiment the process model 4 and the meta model 8 refer to a production process 2 and/or a development process 2 and/or a business process 2.

Figure 2:
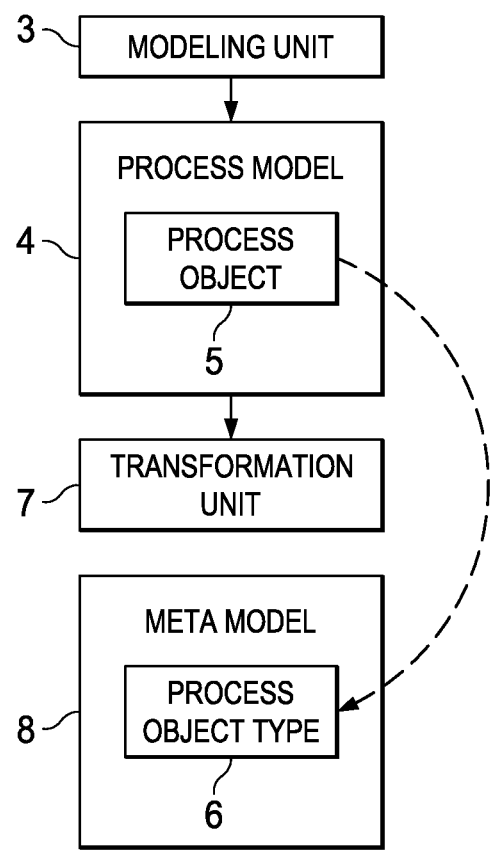
FIG. 2 shows a block diagram of a system according to an example embodiment.

FIG. 2 shows a block diagram of a process modelling system 1 according to an example embodiment.

The process modelling system 1 comprises a modelling unit 3 which is configured to model a process model 4 of a process 2. The modelling unit 3 is further configured to provide the process model 4 to a transformation unit 7. The transformation unit 7 is configured to automatically generate a meta model 8 based on the process model 4.

The process model 4 comprises at least one process object 5. The transformation unit 7 uses the process object 5 in the process model 4 and generates one definition of a process object type 6 in the meta model 8 for every process object 5 in the process model 4. In FIG. 2 this is indicated by a dotted arrow from the process objects 5 in the process model 4 to the definitions of process object types 6 in the meta model 8.

Figure 3:
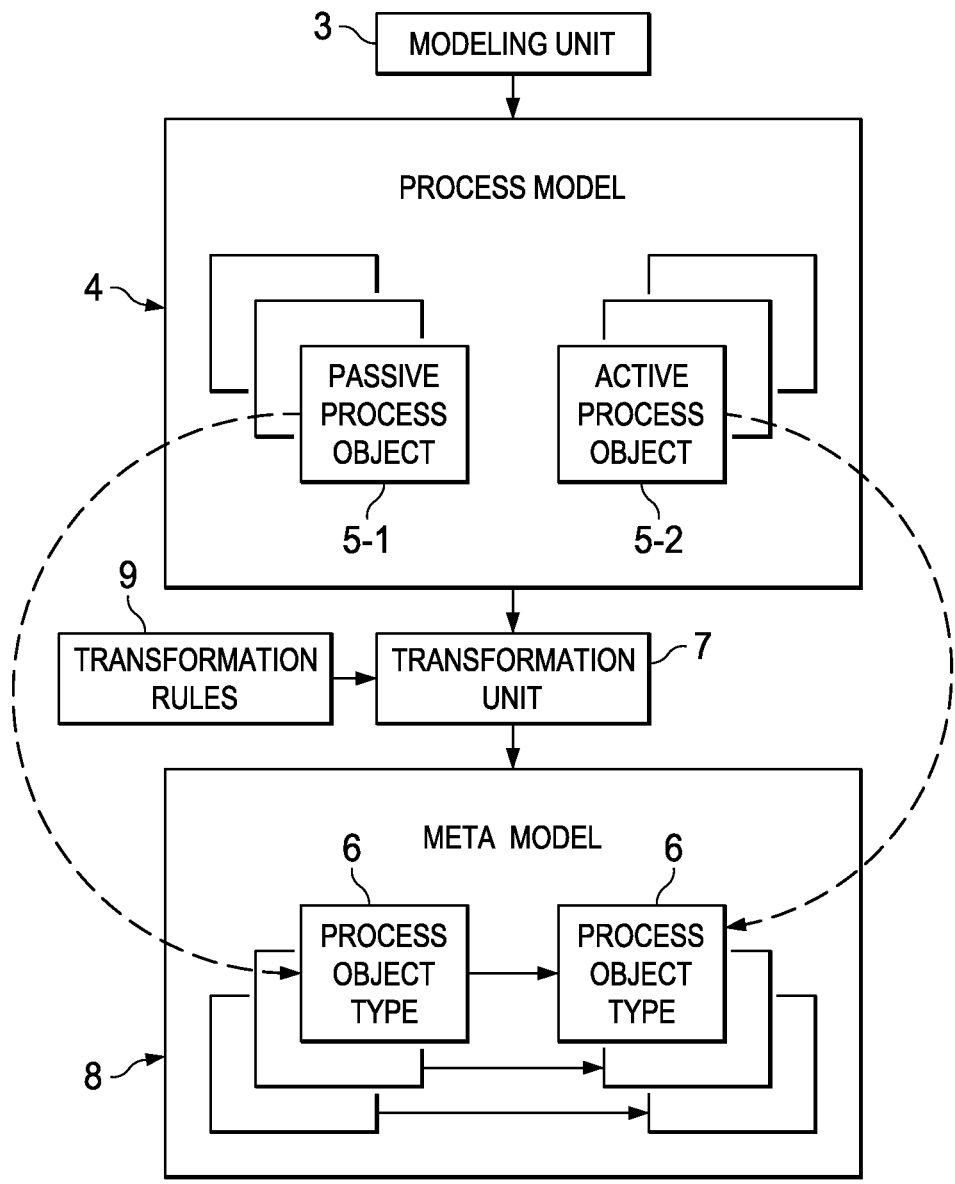
FIG. 3 shows a block diagram of a system according to another example embodiment.

FIG. 3 shows a block diagram of a process modelling system 1 according to another example embodiment.

The process modelling system 1 in FIG. 3 is based on the process modelling system 1 in FIG. 2. In FIG. 3 the process model comprises passive process objects 5-1, wherein more than one passive process object 5-1 is indicated by a layered square symbol. Furthermore, a plurality of active process objects 5-2 is indicated by a similar layered symbol. The passive process objects 5-1 can be artefacts, milestones, or the like. The active process objects 5-2 are e.g. project managers, programmers, or the like, if the process is a software development process.

Although in this embodiment the layered symbols comprise three layers, other embodiments are not limited to three passive process objects 5-1, or three active process objects 5-2. An arbitrary number of passive process objects 5-1, or active process objects 5-2 is possible depending on the specific process model 4.

Furthermore, the meta model 8 in FIG. 3 comprises a plurality of definitions of process object types 6 which are based on the active process objects 5-2 of the process model 4. The meta model 8 also comprises definitions of process object types 6 which are based on the passive process objects 5-1 in the process model 4.

In one embodiment the transformation unit 7 is configured to automatically create in the meta model 8 a definition of a process object type 6 for every user which is involved in the process 2.

In one embodiment the modelling unit 3 and/or the transformation unit 7 are configured to model the process model 4 and/or the meta model 8 modelled using a model description language.

In one embodiment the model description language is a XML-based model description language.

In one embodiment the transformation unit 7 is configured to use transformation rules 9 for automatically transforming the process model 4 into a meta model 8.

In one embodiment the transformation rules 9 are defined using a transformation definition language.

In one embodiment the transformation definition language is an XML-based transformation definition language.

In one embodiment the transformation unit 7 is configured to automatically assign the relation between at least one definition of a process object type 6 in the meta model 8 to at least one other definition of a process object type 6 in the meta model 8. The transformation unit 7 is especially configured to automatically assign the relation between at least one definition of a process object type 6 which is based on one passive process object 5-1 and at least one other definition of a process object type 6 which is based on an active process object 5-2.

In one embodiment the process model 4 and the meta model 8 refer to a production process 2 and/or a development process 2 and/or a business process 2.

In one embodiment the present method/system can be realized using a XSL- or XSLT-engine or -processor(Extensible Stylesheet Language Transformations). The process model 4 could be provided as an XML-file and the transformation rules could be provided as an XSL- or XSLT-file.

In such an embodiment the XSLT-processor would load the process model 4 and the XSLT-file and process the process model 4 according to the XSLT-file.

As an output the XSLT-processor would deliver the meta model 8.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

What is claimed is:

1. A computer implemented method for instantiating a process in a process modelling system, the method comprising:
    using a processor, modelling the process as a process model comprising process objects, the process objects comprising a plurality of passive process objects and a plurality of active process objects including a plurality of users categorized in a plurality of different roles associated with the process;
    using the processor, automatically transforming the process model into a meta model comprising the process objects of the process model as definitions of process object types in said meta model, wherein the transformation of the process model into the meta model includes creating a definition of a distinct process object type for each individual users categorized in the same role associated with the process, such that the meta model enables individual assignment of individual users categorized in the same role to the same or different process object types.

2. The computer implemented method of claim 1, comprising creating in the meta model a definition of a process object type for every user involved in the process.

3. The computer implemented method of claim 1, wherein at least one of the process model and the meta model is modelled using a model description language.

4. The computer implemented method of claim 3, wherein the model description language is a XML-based model description language.

5. The computer implemented method of claim 1, wherein transformation rules are defined for the step of automatically transforming.

6. The computer implemented method of claim 5, wherein the transformation rules are defined using a transformation definition language.

7. The computer implemented method of claim 6, wherein the transformation definition language is an XML-based transformation definition language.

8. The computer implemented method of claim 1 further comprising:
    assigning a relation between at least one definition of a process object type in the meta model and at least one other definition of a process object type in the meta model.

9. The computer implemented method of claim 8, comprising automatically assigning one or more responsibilities in the meta model based on one or more responsibilities of process objects in the process model.

10. The computer implemented method of claim 1, wherein the process model and the meta model refer to at least one of a production process, a development process, and a business process.

11. A process modelling system for modelling a process, the system comprising:
    a modelling unit comprising computer instructions stored in non-transitory computer-readable media and executable by a processor to model a process model of said process, said process model comprising process objects, the process objects comprising a plurality of passive process objects and a plurality of active process objects including a plurality of users categorized in a plurality of different roles associated with the process; and
    a transformation unit comprising computer instructions stored in non-transitory computer-readable media and executable by the processor to automatically transform the process model into a meta model comprising the process objects of the process model as definitions of process object types in said meta model, wherein the transformation of the process model into the meta model includes creating a definition of a distinct process object type for each individual users categorized in the same role associated with the process, such that the meta model enables individual assignment of individual users categorized in the same role to the same or different process object types.

12. The process modelling system of claim 11, wherein the transformation unit is configured to automatically create in the meta model an instance of a definition of a process object type for every user which is involved in the process.

13. The process modelling system of claim 11, wherein at least one of the modelling unit and the transformation unit is configured to model at least one of the process model and the meta model using a model description language.

14. The process modelling system of claim 13, wherein the model description language is a XML-based model description language.

15. The process modelling system of claim 11, wherein the transformation unit is configured to use transformation rules for automatically transforming the process model into a meta model.

16. The process modelling system of claim 15, wherein the transformation rules are defined using a transformation definition language.

17. The process modelling system of claim 16, wherein the transformation definition language is an XML-based transformation definition language.

18. The process modelling system of claim 11,
    wherein the transformation unit is configured to automatically assign a relation between at least one definition of a process object type in the meta model and at least one other definition of a process object type in the meta model; and
    wherein the transformation unit is configured to automatically assign the relation in the meta model based on one or more responsibilities of the process objects in the process model.

19. The process modelling system of claim 11, wherein the process model and the meta model refer to at least one of a production process, a development process, and a business process.

20. A non-transitory computer readable medium comprising a computer program which comprises computer readable instructions executable by a processor to instantiate a process in a process modelling system by:
    modelling the process as a process model comprising process objects, the process objects comprising a plurality of passive process objects and a plurality of active process objects including a plurality of users categorized in a plurality of different roles associated with the process; and
    automatically transforming the process model into a meta model comprising the process objects of the process model as definitions of process object types in said meta model, wherein the transformation of the process model into the meta model includes creating a definition of a distinct process object type for each individual users categorized in the same role associated with the process, such that the meta model enables individual assignment of individual users categorized in the same role to the same or different process object types.

* * * * *